US012774187B2

(12) United States Patent
Wenlin et al.

(10) Patent No.: US 12,774,187 B2
(45) Date of Patent: Oct. 27, 2026

(54) ELEVATOR DISC BRAKE ASSEMBLY

(71) Applicant: KONE Corporation, Helsinki (FI)

(72) Inventors: Henri Wenlin, Helsinki (FI); Antti Saarelainen, Helsinki (FI); Petri Alkula, Helsinki (FI); Lasse Hurri, Helsinki (FI); Andrej Burakov, Helsinki (FI); Joni Lappalainen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 648 days.

(21) Appl. No.: 17/165,556

(22) Filed: Feb. 2, 2021

(65) Prior Publication Data

US 2021/0155450 A1 May 27, 2021

Related U.S. Application Data

(63) Continuation of application No. PCT/FI2018/050597, filed on Aug. 22, 2018.

(51) Int. Cl.

| | |
|---|---|
| ***F16D 55/30*** | (2006.01) |
| ***B66B 1/36*** | (2006.01) |
| ***B66B 5/00*** | (2006.01) |
| ***F16D 65/18*** | (2006.01) |
| ***F16D 65/38*** | (2006.01) |

(Continued)

(52) U.S. Cl.
CPC ............ *B66B 1/365* (2013.01); *B66B 5/0031* (2013.01); *F16D 55/30* (2013.01); *F16D 65/183* (2013.01); *F16D 65/38* (2013.01); *F16D 66/00* (2013.01); *F16D 66/024* (2013.01); *F16D 2066/003* (2013.01); *F16D 2121/22* (2013.01)

(58) Field of Classification Search
CPC ........ F16D 55/30; F16D 65/092; F16D 65/18; F16D 65/183; F16D 65/38; F16D 2121/22; F16D 66/024; B66B 1/365; B66B 5/0031
See application file for complete search history.

(56) References Cited

U.S. PATENT DOCUMENTS 2,914,138 A 11/1959 Borden
4,666,025 A * 5/1987 Rubin .................... F16D 65/18 188/73.38

(Continued)

FOREIGN PATENT DOCUMENTS

CN 201309813 Y 9/2009
CN 103527685 A 1/2014

(Continued)

OTHER PUBLICATIONS

JP-2015110466-A, Abe. (Year: 2015).*

(Continued)

*Primary Examiner* — Thomas J Williams
(74) *Attorney, Agent, or Firm* — Birch, Stewart, Kolasch & Birch, LLP

(57) ABSTRACT

An elevator disc brake assembly includes at least two separate operating disc brake units mounted substantially sequentially on the periphery of the brake disc of an elevator driving machinery where the brake disc and a traction sheave are rotated by a drive motor of the driving machinery. At least one of the disc brake units includes two or more separate brake plates to be pressed against the brake disc.

3 Claims, 5 Drawing Sheets

Figure 1:
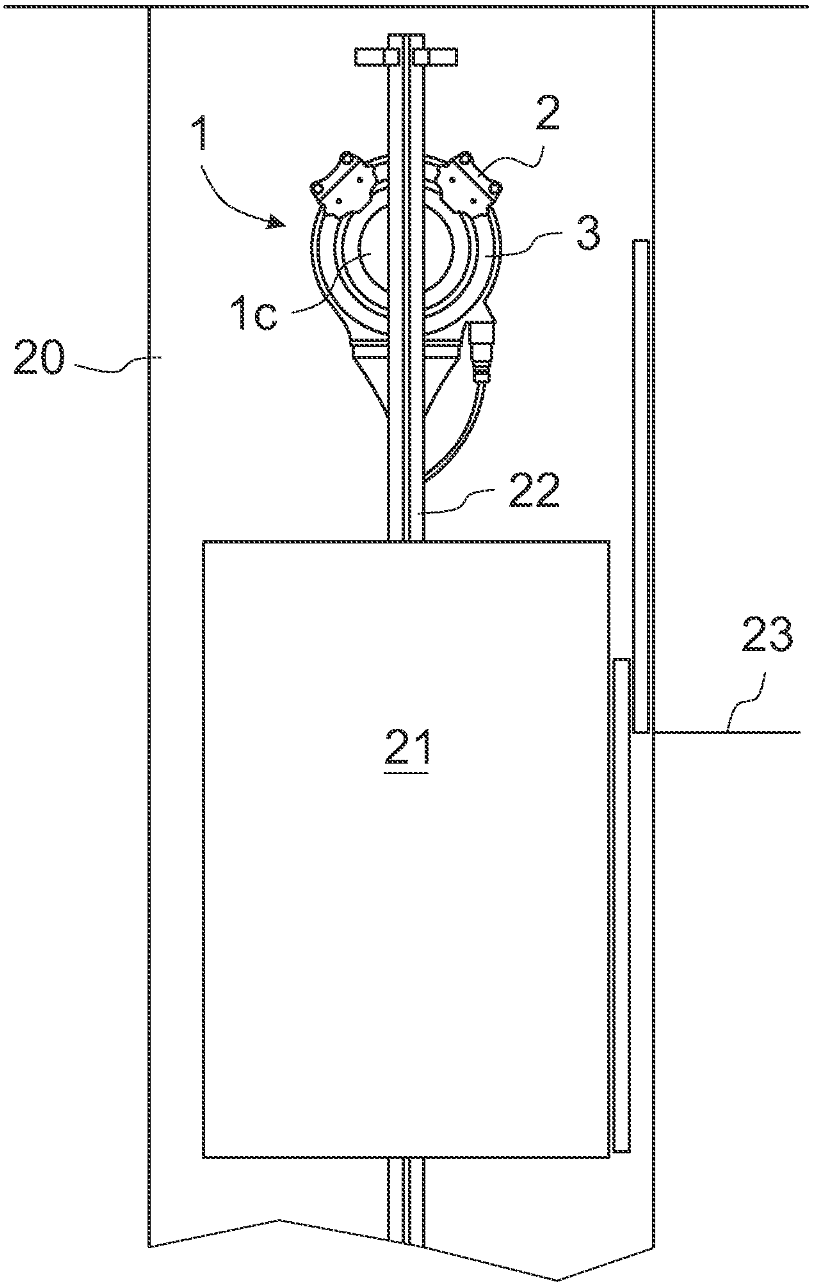

(51) Int. Cl.

| | |
|---|---|
| ***F16D 66/00*** | (2006.01) |
| ***F16D 66/02*** | (2006.01) |
| *F16D 121/22* | (2012.01) |

(56) References Cited

U.S. PATENT DOCUMENTS

| | | | | |
|---|---|---|---|---|
| 5,363,944 | A * | 11/1994 | Thiel | F16D 55/227 188/73.31 |
| 5,944,150 | A * | 8/1999 | Hikari | F16D 65/097 188/161 |
| 7,591,351 | B2 | 9/2009 | Fischer | |
| 8,028,810 | B2 * | 10/2011 | Bach | F16D 65/092 188/73.47 |
| 8,783,423 | B2 * | 7/2014 | Schrewe | F16D 65/18 188/72.5 |
| 9,046,142 | B2 | 6/2015 | Kattainen | |
| 11,597,633 | B2 * | 3/2023 | Lappalainen | B66B 1/32 |
| 2002/0100646 | A1 * | 8/2002 | Maurice | H02K 7/1023 188/161 |
| 2005/0087407 | A1 | 4/2005 | Fischer | |
| 2013/0299281 | A1 | 11/2013 | Låhteenmaki et al. | |
| 2014/0291075 | A1 | 10/2014 | Vlasov | |
| 2015/0075927 | A1 * | 3/2015 | Yoshikawa | F16D 65/092 188/250 B |
| 2015/0114782 | A1 | 4/2015 | Olkkonen et al. | |
| 2017/0363163 | A1 * | 12/2017 | Sanchez Criado | F16D 55/30 |
| 2019/0390725 | A1 * | 12/2019 | Hartmann | F16D 65/092 |
| 2021/0155449 | A1 * | 5/2021 | Wenlin | F16D 65/38 |
| 2021/0155450 | A1 * | 5/2021 | Wenlin | F16D 55/30 |

FOREIGN PATENT DOCUMENTS

| | | | | |
|---|---|---|---|---|
| DE | 102017101525 | A1 * | 7/2018 | F16D 65/092 |
| EP | 1 411 018 | A2 | 4/2004 | |
| EP | 1 701 904 | B1 | 11/2011 | |
| EP | 3401567 | A1 * | 11/2018 | |
| JP | 2006-52035 | A | 2/2006 | |
| JP | 2006-335547 | A | 12/2006 | |
| JP | 6271956 | B2 * | 1/2018 | B66B 1/32 |
| KR | 10-2017-0050466 | A | 5/2017 | |
| WO | WO 00/20320 | A1 | 4/2000 | |
| WO | WO-03062115 | A1 * | 7/2003 | B66B 5/02 |

OTHER PUBLICATIONS

JP-6271956-B2. (Year: 2018).*

International Search Report for PCT/FI2018/050596 (PCT/ISA/210) mailed on Feb. 27, 2019.

International Search Report for PCT/FI2018/050597 (PCT/ISA/210) mailed on Mar. 1, 2019.

Written Opinion of the International Searching Authority for PCT/FI2018/050596 (PCT/ISA/237) mailed on Feb. 27, 2019.

Written Opinion of the International Searching Authority for PCT/FI2018/050597 (PCT/ISA/237) mailed on Mar. 1, 2019.

U.S. Office Action for U.S. Appl. No. 16/547,311, dated Mar. 1, 2022.

U.S. Notice of Allowance for U.S. Appl. No. 16/547,311, dated Dec. 30, 2022.

U.S. Office Action for U.S. Appl. No. 16/547,311, dated Jul. 18, 2022.

* cited by examiner

ELEVATOR DISC BRAKE ASSEMBLY

CROSS REFERENCE TO RELATED APPLICATION

This application is a Continuation of PCT International Application No. PCT/FI2018/050597, filed on Aug. 22, 2018, which is hereby expressly incorporated by reference into the present application.

The present invention relates to an elevator disc brake assembly as defined in the preamble of claim 1.

When using elevators to carry people up and down, the passenger safety is one of the most important aspects. It must be controlled that the elevator car cannot fall freely downwards or move uncontrolled upwards. Also, all accelerations and decelerations must be kept in certain safe limits. Sudden stops even from small speeds may cause injuries for the passengers. And further, an elevator car must stop substantially smoothly in a correct place at the floor where it is landing, and also the elevator car must be able to leave the floor substantially smoothly. In addition, the elevator car must keep in its position in a floor also in overload situations.

For the reasons mentioned above the authorities in different countries have drafted various regulations related to elevator safety issues. The basic principle is that the brake arrangement of an elevator must be able to stop the elevator car from its nominal speed and keep the elevator car in its position in a floor also in overload situations. In addition, the brake arrangement must be fault tolerant so that one mechanical fault is not able to make the brake arrangement totally inoperative.

Among other things, some safety regulations request that the elevator brake must be mechanically doubled so if one part of the brake failures another part of the brake still works properly. Mechanically doubled elevator brakes are used in normal operation so that both the brakes are always used at the same time. A problem with this kind of a use is that a mechanical failure of one of the brakes in the pair is not necessarily discovered. In that case the elevator may operate a long time hinging on one brake only. This may cause surprisingly dangerous situations.

Some other safety regulations request that the elevator must have one driving machine brake or operating brake and one emergency brake. In some solutions safety brakes, operating in contact with elevator guide rails, act as emergency brakes. If the driving machine operating brake failures the safety brake has to stop the elevator car within a predetermined displacement so that an uncontrolled acceleration of the elevator car will not arise. A problem with these solutions is that the emergency brake is activated only when a considerable speed or acceleration has already been achieved and a dangerous situation has grown up. The emergency brake can prevent fatal injuries of the passengers, but it is not able to prevent down fallings and/or all nonfatal injuries.

One object of the present invention is to eliminate drawbacks of prior art technology and to achieve a safe and reliable elevator disc brake assembly with two or more relatively small-sized operation brake units by the help of which a braking torque can easily be shared to several brake plates. In that case also one object of the present invention is to reduce and minimize the effects caused by a failure of one brake unit. The elevator disc brake assembly according to the invention is characterized by what is disclosed in the characterization part of claim 1. Other embodiments of the invention are characterized by what is disclosed in the other claims.

The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise, the different details presented in connection with each embodiment can also be applied in other embodiments. In addition, it can be stated that at least some of the subordinate claims can, in at least some situations, be deemed to be inventive in their own right.

An aspect of the invention is to provide an elevator disc brake assembly, which assembly comprises at least two separate operating disc brake units mounted substantially sequentially on the periphery of the brake disc of an elevator driving machinery where the brake disc and a traction sheave are rotated by a drive motor of the driving machinery. Advantageously at least one of the disc brake units comprises two or more separate brake plates to be pressed against the brake disc.

One significant advantage of the brake assembly according to the invention is that thanks to at least two brake units and several brake plates a failure of a brake part decreases the usable braking torque only a little, and the brake arrangement remains operable. Another advantage of the invention is that the elevator disc brake assembly according to the invention is reliable, cost effective and requires only a little space. Yet another advantage is higher ride comfort due to decreased deceleration fluctuation as well as a quieter operation of the brakes. Yet a further advantage is that the small and simple disc brake unit is easy to adjust and maintain. Yet one advantage is a robust cast design, resulting in a smaller and cheaper solution, having also more degrees of freedom in the outer shape of the brake unit. In addition, the disc brake arrangement according to the invention has a non-coinciding torque and hence deceleration minimum, resulting in a more stable overall torque. And yet one more advantage is that the cast design has also more degrees of freedom in the dimensioning of the brake unit, making the fulfillment of the space box requirements easier. Yet one more advantage is that smaller brake units lead to a machinery with smaller deceleration, which further leads to better safety and comfort, as well as a smaller space box and price of the brake arrangement.

In an advantageous embodiment two brake units are attached to the drive machine frame by lugs or other type attaching interfaces. Advantageously each of the brake units comprises two brake plates, the brake plates are arranged to be move between braking contact with the brake disc and a noncontact position apart from the brake disc.

Figure 2:
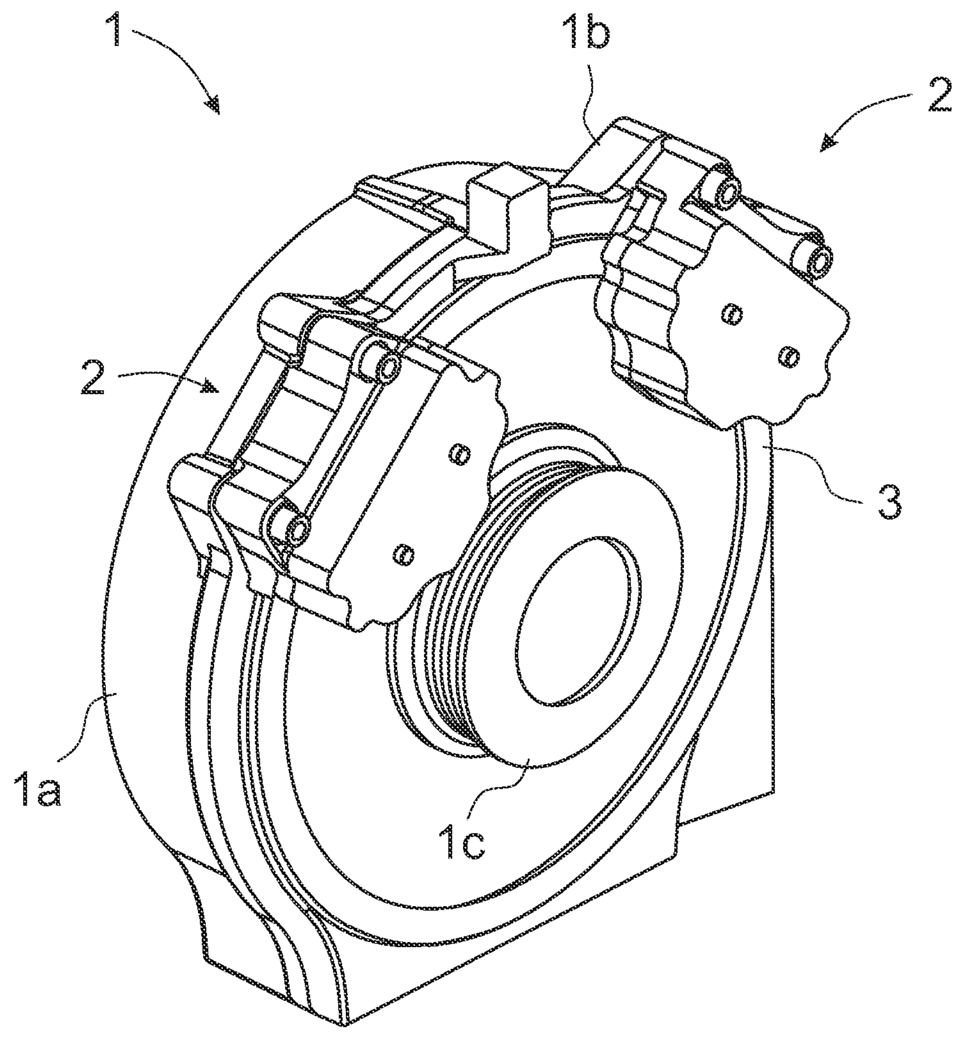
Figure 3:
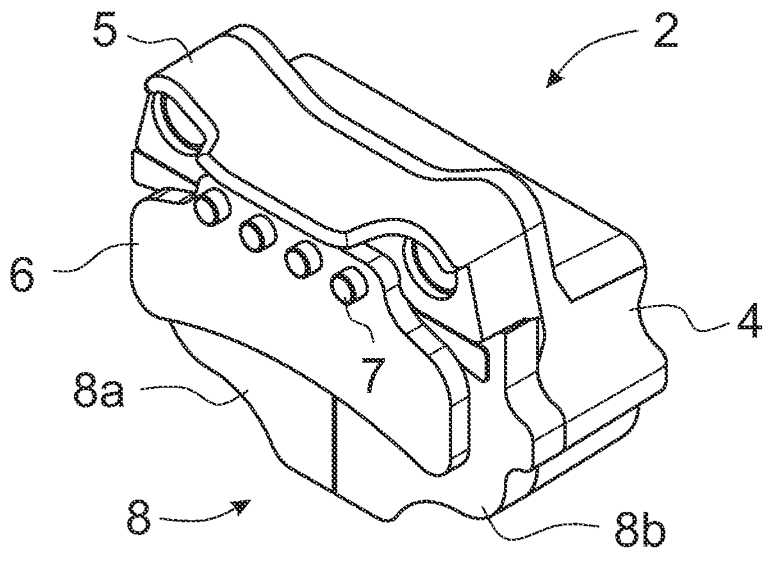
Figure 4:
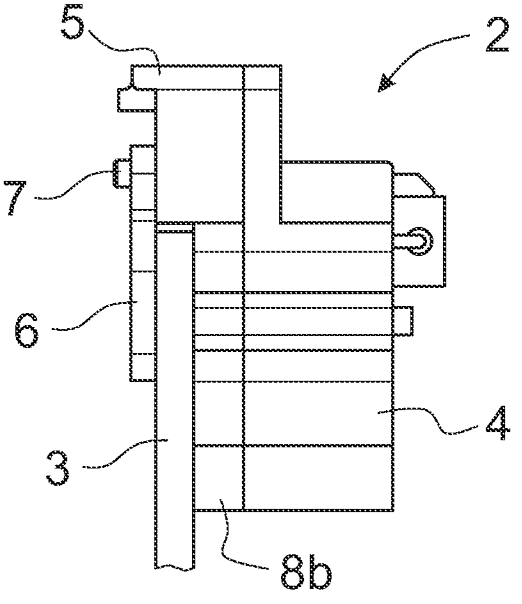
Figure 5:
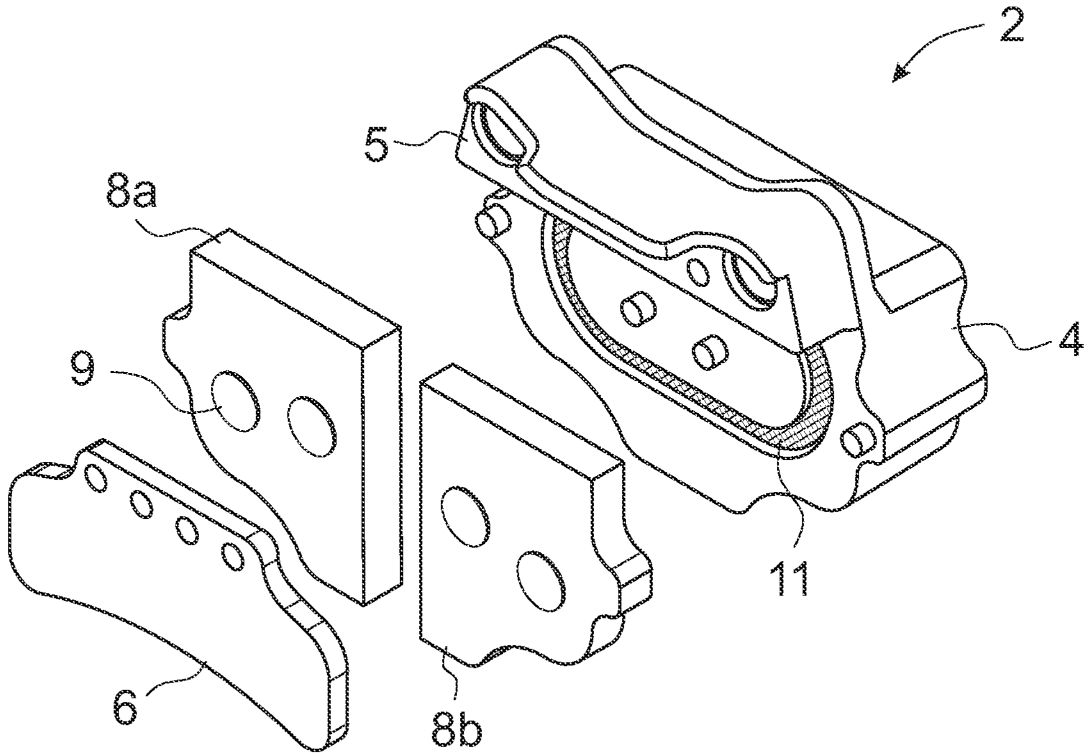
Figure 6:
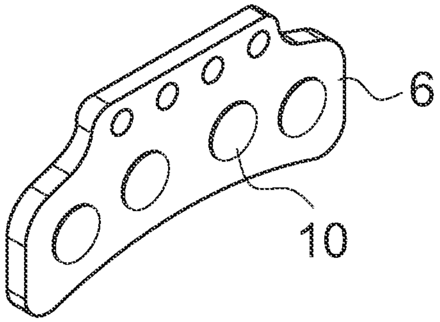
Figure 7:
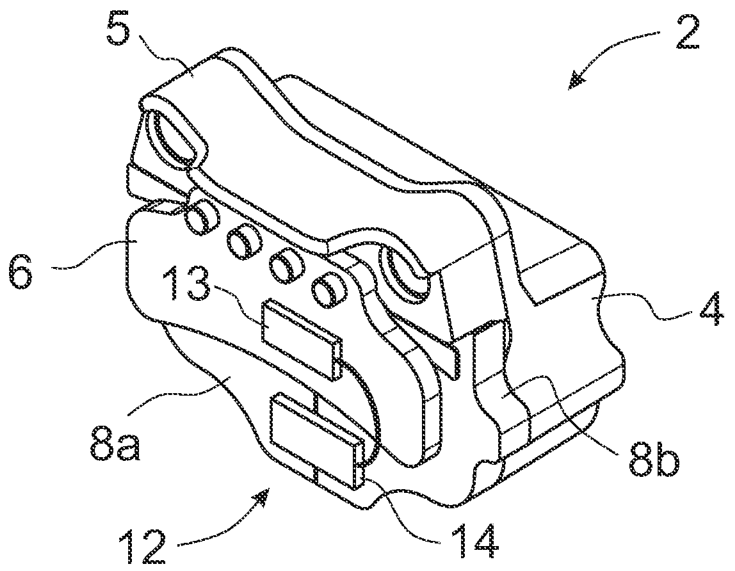
Figure 8:
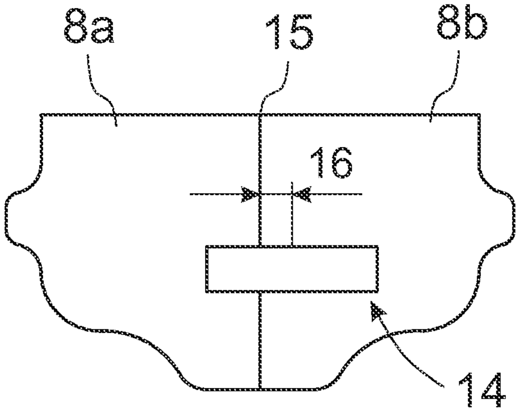

In the following, the invention will be described in detail by the aid of example embodiments by referring to the attached simplified and diagrammatic drawings, wherein FIG. 1 presents in a simplified and diagrammatic side view an upper end of an elevator shaft with an elevator machinery according to the invention, and an elevator car approaching the uppermost floor level, FIG. 2 presents in a simplified and diagrammatic oblique top view an elevator machinery with two driving machine brake units according to the invention, FIG. 3 presents in a simplified and diagrammatic oblique top view a driving machine brake unit according to the invention, FIG. 4 presents in a simplified and diagrammatic end view the driving machine brake unit according to FIG. 3, FIG. 5 presents in a simplified and diagrammatic oblique top view the driving machine brake unit according to FIG. 3 as an exploded view with only main components shown, FIG. 6 presents in a simplified and diagrammatic oblique top view the counter element of the driving machine brake unit according to the invention, FIG. 7 presents in a simplified and diagrammatic oblique top view yet another embodiment of the driving machine brake unit according to the invention, and FIG. 8 presents in a simplified and diagrammatic front view a proximity sensor, used in an advantageous embodiment of the invention, in its position in relation to the brake plates of a driving machine brake unit according to the invention.

FIG. 1 presents in a simplified and diagrammatic side view a part of the building where a side wall of an elevator shaft 20 is removed, and an elevator car 21 is approaching the uppermost floor level 23. An elevator driving machinery 1 with a traction sheave 1*c*, two operating disc brake units 2 and a brake disc 3 is preferably fastened to a guide rail 22 at the upper end of the elevator shaft 20.

The elevator is a so-called Machine-Room-Less (MRL) elevator where the elevator driving machinery 1 with its operating brake units 2 and traction sheave 1*c* is in the elevator shaft 20 or in an appropriate space adjacent to the elevator shaft 20, and preferably in the upper area of the elevator shaft, advantageously just below the ceiling of the elevator shaft 20. The elevator car 21 is arranged to run up and down in the elevator shaft 20 along guide rails 22 guided by guide shoes. In addition, the elevator comprises a counterweight or balance weight that is also arranged to run up and down in the elevator shaft 20 along its own guide rails. The counterweight and its guide rails are not presented in FIG. 1 for the sake of clarity.

The elevator car 21 and the counterweight are connected to each other with elevator ropes or hoisting ropes that also are not presented in FIG. 1 for the sake of clarity. The cross section of the hoisting ropes can preferably be round or as a flat rectangle. The elevator car 21 is also equipped with safety gear arrangement. The safety gear arrangement is arranged to stop the movement of the elevator car 21 and to facilitate an easy and safe locking of the elevator car 21 into the guide rails 22 when needed.

FIG. 2 presents in a simplified and diagrammatic oblique top view an elevator driving machinery 1, which comprises at least a housing 1*a*, a drive motor, a traction sheave 1*c*, preferably two operating disc brake units 2 and a brake disc 3. The drive motor is inside the machinery housing 1*a* and is arranged to rotate simultaneously the coaxial traction sheave 1*c* and brake disc 3. The operating disc brake units 2 are fastened floatably to fastening lugs 1*b* on the outer periphery of the housing 1*a*. The operating disc brake units 2 have been arranged to decelerate and stop the rotational movement of the brake disc 3 and at the same time also the rotational movement of the traction sheave 1*c*. The operating disc brake units 2 act also as holding brakes to keep the elevator car 21 in its position during loading and unloading phases, and also when being out of use, as mentioned earlier. The operating disc brake units 2 can also be called brake calipers.

A disc brake type operating brake unit 2 according to the invention is advantageously used as an elevator driving machine brake unit to decelerate and stop movements of the elevator car 21 and/or to keep the elevator car 21 in its position during loading and unloading phases and also when being out of use. Later in this context the term elevator driving machine operating disc brake unit 2 or brake caliper is also called shorter only the brake unit 2.

The invention relates to an elevator disc brake assembly with at least two disc brake units 2 each having at least two brake plates. Advantageously each brake unit 2 comprises means or monitoring arrangement for monitoring operation states of their both brake plates. In the elevator disc brake assembly the required states of the brake plates of the two-plate brake units 2 are monitored with the monitoring arrangement comprising at least a state indicator assembly that preferably comprises a monitoring/measuring sensor. The purpose of the monitoring is to secure the reliable operation of the brake units 2 by checking if both the brake plates of the brake units 2 are working properly, abnormally or if they do not work at all.

FIG. 3 presents in a simplified and diagrammatic oblique top view an operating disc brake unit 2 used in the elevator brake assembly according to the invention. Among other things each brake unit 2 comprises a body 4, a top element 5, a counter element 6 with its fastening screws 7 and a brake plate assembly 8 having two separate brake plates 8*a*, 8*b*. The counter element 6 can be also called a caliper plate. The body 4 forms a hollow housing inside which a spring assembly for pressing the brake plates 8*a*, 8*b* towards the counter element 6 and brake disc 3 is placed. Advantageously, the spring assembly comprises separate spring actuators for each brake plate 8*a*, 8*b*. Each spring actuator may comprise one or more springs. Preferably, the springs are compression springs. That kind of brake structure is safe because in case of electric failure the springs of the spring assembly press mechanically the brake plates 8*a*, 8*b* towards the brake disc 3 and the rotation of the traction sheave 1*c* and also the vertical movement of the elevator car 21 is stopped in a safe way.

Also, an electromagnet arrangement comprising a coil assembly causing a magnetic force for pulling the brake plates 8*a*, 8*b* free from the brake disc 3 when the brake is opened is placed inside the body 4.

For the sake of clarity, the spring assembly and electromagnet arrangement are not presented in FIG. 3.

The disc brake assembly according to the invention is arranged to operate so that when the electromagnet arrangement comprising the coil assembly is powered the brake plates 8*a*, 8*b* are pulled against the body 4 of the brake unit 2 free from the brake disc 3. In that case the brake is open and the brake disc 3 and the traction sheave 1*c* can be rotated. In this operation state of the brake also both the brake plates 8*a*, 8*b* are said to be open. The brake is activated or closed by switching the power off from the electromagnet arrangement. In that case the springs of the spring assembly press the brake plates 8*a*, 8*b* against the brake disc 3 that cannot be rotated any more.

The top element 5 forms an intermediate element between the body 4 of the brake unit 2 and the fastening lugs 1*b* in the housing 1*a* of the driving machinery 1 to which lugs 1*b* the brake units 2 are floatably fastened so that the brake units 2 are able to move properly when needed in the axial direction of the elevator driving machinery 1.

FIG. 4 presents in a simplified and diagrammatic end view the driving machine operating disc brake unit 2 according to FIG. 3. The figure shows the brake disc 3 in a gap between the counter element 6 and the brake plates 8*a*, 8*b*. Only a part of the brake disc 3 is shown in the figure. The brake units 2 are mounted into its operating location so that only the outer circumference of the brake disc 3 is in the gap between the counter element 6 and the brake plates 8*a*, 8*b*. Thus, the counter element 6 is arranged to press against the first brake surface of the brake disc 3 on the first side of the brake disc 3, and the brake plates 8*a*, 8*b* are arranged to press against the second brake surface of the brake disc 3 on the second side of the brake disc 3.

FIG. 5 presents in a simplified and diagrammatic oblique top view one of the driving machine operating disc brake units 2 according to FIG. 3 as an exploded view with only main components shown. For the sake of clarity, the brake plates 8*a*, 8*b* are slightly separated from each other. The brake plates 8*a*, 8*b* are substantially flat plates comprising a group of friction pads or linings 9 on the surface that is facing to the rotating brake disc 3.

Preferably, the size and shape of the brake plates 8*a*, 8*b* in the disc brake unit 3 are substantially equal but the thickness is different so that, for example, the first brake plate 8*a* is thicker than the second brake plate 8*b*. For that reason, the horizontal gap between the braking surface of the first brake plate 8*a* and the braking surface of the brake disc 3 is smaller than the corresponding gap between the braking surface of the second brake plate 8*b* and the braking surface of the brake disc 3. That feature makes the sequential brake arrangement possible. Due to the smaller gap the first brake plate 8*a* hits the brake disc 3 slightly earlier than the second brake plate 8*b* when a braking is actuated and the brake is closed by the spring assembly after the magnetic force provided by the coil assembly is weakened or removed. This braking arrangement gives a higher ride comfort due to decreased deceleration fluctuation, as well as a quieter operation because there are only two minor clicks instead of one louder slam.

Above is mentioned that the brake plates 8*a*, 8*b* in each disc brake unit 2 are otherwise similar but preferably their thickness is unequal. Thus, there may be altogether four brake plates 8*a*, 8*b* with four diverse thickness, or two brake plates 8*a* with a first thickness and the other two brake plates 8*b* with a second thickness. So, in the first case all the brake plates 8*a*, 8*b* are unequal in their thickness. Thus, they all can be pressed against the braking surface of the brake disc 3 at slightly diverse time, one after the other.

FIG. 5 also presents a coil 11 of the coil assembly for an electromagnet arrangement that is arranged to open the brake by pulling the brake plates 8*a*, 8*b* free from the brake disc 3. The electromagnet arrangement is placed inside the body 4. In this embodiment the body 4 comprises only one coil 11 that is common for both the brake plates 8*a*, 8*b*. Therefore, the coil 11 extends, preferably symmetrically, to the area of each brake plate 8*a*, 8*b* and is arranged to interact in the same way with both the brake plates 8*a*, 8*b*.

In another advantageous embodiment according to the invention the coil assembly may comprise a separate coil for each brake plate 8*a*, 8*b*. Preferably in that embodiment the brake assembly comprises adjusting means for adjusting each brake plate 8*a*, 8*b* separately. Thus, the first brake plate 8*a* is interacted by the first coil and the second brake plate 8*b* is interacted by the second coil. In this embodiment the operation of the two brake plates 8*a*, 8*b* can be freely adjusted.

FIG. 6 presents in a simplified and diagrammatic oblique top view the counter element 6 of the driving machine operating brake unit 2 according to the invention. The counter element 6 also comprises friction pads or linings 10 on its surface that is facing to the rotating brake disc 3. Preferably those pads or linings 10 are substantially similar to the pads or linings 9 of the brake plates 8*a*, 8*b*.

FIGS. 7 and 8 present in a simplified and diagrammatic view yet another advantageous embodiment of the driving machine operating brake unit 2 according to the invention. In this embodiment a single proximity sensor 12 comprising a processor unit 13 and an antenna 14 is used as a state indicator to make monitoring the operation states of the brake unit 2 possible by measuring instantaneous locations of the two brake plates 8*a*, 8*b* in relation to the brake disc 3. The term “operation state” in this context preferably means a horizontal distance of the brake plates 8*a*, 8*b* from the brake disc 3.

FIG. 7 presents the proximity sensor 12 fastened to its place in the brake unit 2, and FIG. 8 presents in a simplified and diagrammatic front view the antenna 14 of the proximity sensor 12 in its offset position in relation to the brake plates 8*a*, 8*b* of the driving machine operating brake unit 2 according to the invention.

Advantageously, the processor unit 13 of the proximity sensor 12 is fastened, for example, to the counter element 6, and the antenna 14 is placed in the brake unit 2 with an offset 16 in relation to the line 15 of the facing surfaces of the brake plates 8*a*, 8*b*. The offset 16 is essential because it makes it possible to separate the proximity or the operation state of the first brake plate 8*a* from the proximity or the operation state of the second brake plate 8*b*. In that case an adequate number of operation states, namely four main operation states, are obtained to reliably monitor the functions of the brake units 2.

The four operation states obtained are:

The first operation state Os1. In that case both the brake plates 8*a*, 8*b* are open.

The second operation state Os2. In that case the first brake plate 8*a* closed.

The third operation state Os3. In that case the second brake plate 8*b* closed.

The fourth operation state Os34. In that case both the brake plates 8*a*, 8*b* are closed.

The four operation states Os1-Os4 of the brake unit 2 can be deduced by the single proximity sensor 12 that is placed in the brake unit 2 with an offset 16 in relation to the line 15 of the facing surfaces of the brake plates 8*a*, 8*b*. For the deduction the losses in the vibrating magnetic field created by the LC resonator of the proximity sensor 12 are measured.

The monitoring arrangement mentioned above can be applied with proximity sensors that are placed so that when the braking is activated the brake plates 8*a*, 8*b* come closer to the sensor and/or its antenna 14, and when the brake is open the brake plates 8*a*, 8*b* are further from the sensor and/or its antenna 14. With other types of sensors or other kinds of positioning the sensors, the monitoring arrangement may be different and may work in a different way.

In general, it is characteristic to the assembly according to the invention that it has at least two separate operating disc brake units 2, each brake unit 2 comprising at least two separate brake plates 8*a*, 8*b* that are placed sequentially in the direction of rotation of the brake disc 3, and that each brake unit 2 of the assembly comprises at least a state indicator assembly to measure and monitor the instantaneous operation states of the brake plates 8*a*, 8*b*. The state indicator assembly may be such as the proximity sensor 12 with its processor unit 13 and antenna 14 as mentioned above, or a corresponding assembly. Instead of proximity sensors also other advantageous sensors may be used to measure the operation states of the brake plates 8*a*, 8*b*.

Preferably, the instantaneous distances of both the brake plates 8_a_, 8_b_ from the brake disc 3 are measured and according to the measuring results the monitoring is applied. Also essential is the asymmetrical positioning of the sensor or at least its antenna 14. By doing so, adequate measuring results can be obtained with a simpler way. The corresponding results can be obtained also by using sensors with a nonhomogenous field distribution. In that case the asymmetrical positioning of the sensor and/or its antenna is not necessary.

It is obvious to the person skilled in the art that the invention is not restricted to the examples described above but that it may be varied within the scope of the claims presented below. Thus, for instance the number, structures and components of the operating disc brake units may differ from what is presented above. For instance, instead of two operating disc brake units there may be three or four or even more disc brake units in the outer periphery of the brake disc.

It is also obvious to the person skilled in the art that instead of two brake plates in each operating disc brake unit there may be three or four or even more brake plates in each operating disc brake unit.

The invention claimed is:

1. An elevator disc brake assembly, comprising:

at least two separate operating disc brake units mounted substantially sequentially on a periphery of a brake disc of an elevator driving machinery, where the brake disc and a traction sheave are rotated by a drive motor of the driving machinery, wherein at least one of the disc brake units comprises two or more separate brake plates to be pressed against the brake disc, wherein each disc brake unit comprises a state indicator assembly that is arranged to measure an instantaneous position of each brake plate in relation to the brake disc, wherein the state indicator assembly comprises an antenna that is placed with an offset in relation to the position of the brake plates, and wherein a smaller area of the antenna is facing the first brake plate and a greater area of the antenna is facing the second brake plate.

2. An elevator disc brake assembly, comprising:

at least two separate operating disc brake units mounted substantially sequentially on a periphery of a brake disc of an elevator driving machinery, where the brake disc and a traction sheave are rotated by a drive motor of the driving machinery, wherein at least one of the disc brake units comprises two or more separate brake plates to be pressed against the brake disc, wherein each disc brake unit comprises a state indicator assembly that is arranged to measure an instantaneous position of each brake plate in relation to the brake disc, and wherein the state indicator assembly is arranged to detect at least four different operation states of the brake plates in each disc brake unit.

3. The elevator disc brake assembly according to claim 2, wherein the four different operation states of the brake plates are as follows: both the brake plates are open (Os1), the first brake plate is closed and the second brake plate is open (Os2), the second brake plate is closed and the first brake plate is open (Os3), and both the brake plates are closed (Os4).

* * * * *